United States Patent
Esfandiari et al.

(10) Patent No.: US 7,583,605 B2
(45) Date of Patent: Sep. 1, 2009

(54) METHOD AND SYSTEM OF EVALUATING SURVIVABILITY OF ATM SWITCHES OVER SONET NETWORKS

(75) Inventors: Mehran Esfandiari, Oakland, CA (US); Laxman Sahasrabuddhe, Davis, CA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 568 days.

(21) Appl. No.: 11/077,168

(22) Filed: Mar. 10, 2005

(65) Prior Publication Data

US 2006/0203734 A1   Sep. 14, 2006

(51) Int. Cl.
*G01R 31/08* (2006.01)
*G06F 15/173* (2006.01)

(52) U.S. Cl. ............... 370/248; 370/217; 370/218; 709/223; 709/224

(58) Field of Classification Search .......... 370/248, 370/254, 255, 257, 258, 395.1, 395.3, 395.41, 370/395.51, 400, 403, 404, 406, 409, 411, 370/419, 420, 216–228; 709/220–224, 226, 709/227–228
See application file for complete search history.

(56) References Cited

U.S. PATENT DOCUMENTS

| | | | |
|---|---|---|---|
| 5,949,755 A * | 9/1999 | Uphadya et al. ............ 370/224 |
| 6,473,397 B1 * | 10/2002 | Au ............................. 370/223 |
| 6,745,347 B1 * | 6/2004 | Beardsley et al. ............ 714/43 |
| 7,236,587 B2 * | 6/2007 | Zerressen .................. 379/414 |
| 7,260,066 B2 * | 8/2007 | Wang et al. ................ 370/248 |
| 2003/0112760 A1 * | 6/2003 | Puppa et al. ............ 370/241.1 |
| 2003/0172319 A1 * | 9/2003 | Ryhorchuk et al. .......... 714/27 |
| 2003/0189919 A1 * | 10/2003 | Gupta et al. ............... 370/351 |
| 2005/0185597 A1 * | 8/2005 | Le et al. .................... 370/254 |
| 2006/0104199 A1 * | 5/2006 | Katukam et al. ........... 370/216 |
| 2006/0117212 A1 * | 6/2006 | Meyer et al. .................. 714/4 |

* cited by examiner

*Primary Examiner*—Aung S Moe
*Assistant Examiner*—Redentor M Pasia
(74) *Attorney, Agent, or Firm*—Toler Law Group

(57) ABSTRACT

In a particular embodiment, a method of evaluating a network is disclosed. The method identifies potential failure points between a layer two asynchronous transfer mode network and a layer one Synchronous Optical Network (SONET) network. The method includes identifying a first set of circuit identifiers of inter-nodal links of a layer two asynchronous transfer mode (ATM) network, correlating a second set of circuit identifiers associated with elements of a layer one SONET network, identifying a subset of the first set of circuit identifiers of those inter-nodal links that are mated with each other, and comparing the subset of the first set of circuit identifiers to the second set of circuit identifiers to identify single point of failure elements including interface elements and add drop multiplexer elements.

19 Claims, 3 Drawing Sheets

METHOD AND SYSTEM OF EVALUATING SURVIVABILITY OF ATM SWITCHES OVER SONET NETWORKS

FIELD OF THE DISCLOSURE

The present disclosure is generally related to network evaluation of two layer networks, such as Asynchronous Transfer Mode (ATM) and Synchronous Optical Network (SONET) networks.

BACKGROUND

Asynchronous Transfer Mode (ATM) switches are connected to each other via Inter-Nodal Links (INLs). In major metro areas, multiple switches are typically connected via a mesh of interconnection, such as a star configuration, or a hierarchical "edge/core" configuration. In most metro locations, the INLs are TDM circuits, and SONET Add/Drop Multiplexers (ADMs) are used to carry these circuits. SONET ADMs are typically arranged in a point-to-point configuration or in rings.

This configuration creates a 2-layer network. The upper layer comprises Asynchronous Transfer Mode (ATM) switches that are connected with each other using Inter-Nodal Links (INLs). The lower layer comprises SONET rings, which contain Add/Drop Multiplexers (ADMs) connected in a point-to-point or ring fashion. The INLs may be routed over the SONET rings without regard to impact of such routing on the survivability of the ATM layer. This can result in single point of failures (SPOFs).

Specifically, for provisioning and routing, multiple Inter-Nodal Link (INL) circuits can be put on the same SONET Add/Drop Multiplexer (ADM) (and even on the same interface card). While SONET provides underlying survivability via Automatic Protection Switching (APS) and diversity rings, the above scenario creates Single Point of Failure (SPOF) for multiple INLs that come from the same Asynchronous Transfer Mode (ATM) switch or set of related ATM switches.

Identifying and analyzing the survivability impact of these Single Points of Failure (SPOF) and providing alternatives to such SPOFs, to increase the overall survivability of the Asynchronous Transfer Mode (ATM) network is a big challenge for network operators.

Currently there are some mechanized tools that identify Single Points of Failure (SPOFs) at the Asynchronous Transfer Mode (ATM) layer based on the Inter-Nodal Link (INL) topology, but without knowledge of the SPOFs in the underlying SONET layer. Similarly, there are tools that identify SPOFs at the SONET layer, but they do not have knowledge of the impact on the upper layers, e.g., ATM layer. SPOFs in a two-layer network (e.g., ATM over SONET) cannot be identified accurately without knowledge of both layers. Further, such tools are not adapted for use with existing SONET inventory systems.

In other words, present Single Point of Failure (SPOF) identification tools lack a comprehensive 2-layer (e.g., Asynchronous Transfer Mode (ATM) & SONET) analysis, and even as a tool in a single layer analysis only operate for "Greenfield" environments where no existing SONET inventory system (such as Trunk Information Record Keeping System (TIRKS)/Planning Work Stations (PWS)) can be easily accommodated. As a result, network designers and planners have difficulty in locating SPOFs using a single tool. This can lead to catastrophic network failures.

BRIEF DESCRIPTION OF THE DRAWINGS

FIG. 1 is a block diagram of an illustrative system for performing network on;

DETAILED DESCRIPTION OF THE DRAWINGS

In a particular embodiment, a network evaluation system is disclosed. The system includes a first input to receive a first set of circuit identifiers of inter-nodal links of a layer two asynchronous transfer mode (ATM) network and a second input to receive a second set of circuit identifiers associated with elements of a layer one SONET network. The system includes a network evaluation system to identify potential failure points between the layer two ATM network and the layer one SONET network. The network evaluation logic includes program logic to correlate the second set of circuit identifiers associated with elements of the layer one SONET network with the first set of circuit identifiers, identify a subset of the first set of circuit identifiers of those inter-nodal links that are mated with each other, and compare the subset of the first set of circuit identifiers to the second set of circuit identifiers to identify single point of failure elements including interface elements and add drop multiplexer elements.

In another embodiment, a method of evaluating a network is disclosed. The method identifies potential failure points between a layer two asynchronous transfer mode network and a layer one SONET network. The method includes identifying a first set of circuit identifiers of inter-nodal links of a layer two asynchronous transfer mode (ATM) network, correlating a second set of circuit identifiers associated with elements of a layer one SONET network, identifying a subset of the first set of circuit identifiers of those inter-nodal links that are mated with each other, and comparing the subset of the first set of circuit identifiers to the second set of circuit identifiers to identify single point of failure elements including interface elements and add drop multiplexer elements.

Figure 1:
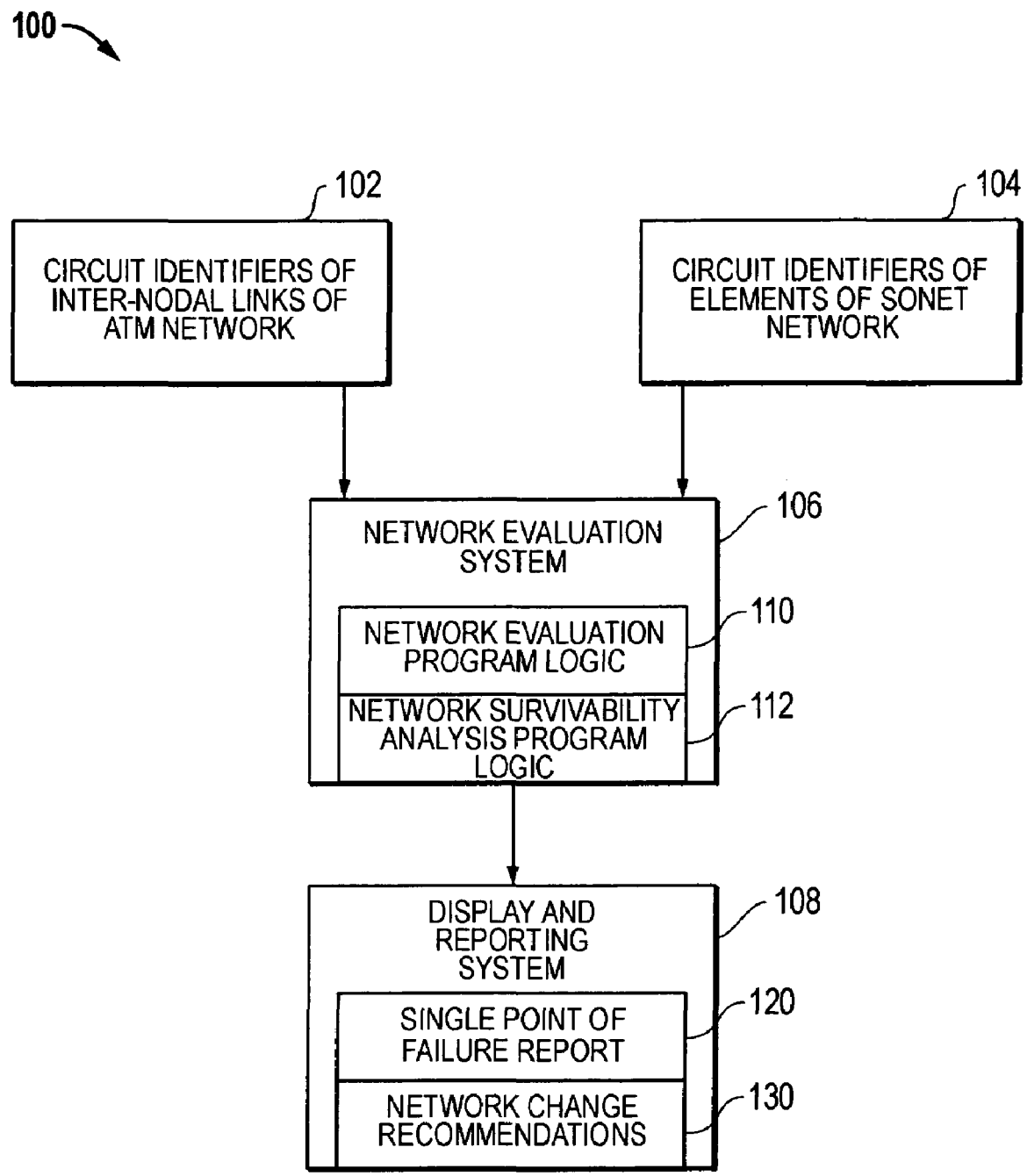

Referring to FIG. 1, a system for use in evaluating a network for survivability is shown. The system 100 includes a network evaluation system 106 having a first input to receive circuit identifiers of inter-nodal links of an ATM network 102 and a second input to receive circuit identifiers of elements of a SONET network 104. The circuit identifiers of elements of the SONET network 104 may be provided by a computer inventory system, such as TIRKS/PWS. The inventory system for the layer two SONET network may also provide data to identify and match those paired or mated INLs where redundancy is assumed by network planners. The circuit identifiers 102, 104 may be provided as data files from a network management system. For example, a conventional OSS inventory database system used by telephone companies can provide the circuit identifier data. The network evaluation system 106 may be implemented as a computer system that includes network evaluation program logic 110 to map circuit identifiers between layers one and two and that includes network survivability analysis program logic 112. Each of these programs 110, 112 may be implemented as one or more sets of computer programs stored in a computer readable memory and executable by a computer processor.

The network evaluation system 106 may be coupled directly, or through a network, to a display and reporting system 108. The display and reporting system 108 may be a display terminal device, a printer, or other type of display or reporting device that may be used by network operations personnel. The display and reporting system 108 may provide reports that identify results of executing the network evaluation program 110, such as a report of identified single point of failure elements 120. Similarly, the display and reporting system 108 may provide reports resulting from execution of the network survivability analysis program 112, such as network change recommendations 130 or network analysis and survivability metrics.

During operation, circuit identifiers of the ATM network 102 and the circuit identifiers of elements of the SONET network 104 are received at the network evaluation system 106. The network evaluation system 106 executes the network evaluation program logic 110 to conduct a network survivability evaluation of the combined ATM/SONET network. In contrast to certain conventional tools, the network evaluation program 110 receives data for both the ATM network and the SONET network. The network survivability evaluation includes a correlation and matching operation between the circuit identifiers of the ATM and SONET networks to identify SPOFs elements.

For example, an automated software tool may use a customized algorithm to correlate ATM INL endpoints with the underlying SONET ADMs and rings to identify SPOFs. An example of such SPOF elements include network ports and add drop multiplexers (ADMs). The SPOF report may disclose multiple sets of pre-categorized SPOFs, i.e. by single ATM switch, ATM switch locations, or Edge/Core ATMs. Some of the SPOF elements identified by the network evaluation program logic may be undetectable to conventional single network tools.

After identification of the single point of failure elements (SPOFs), each of the SPOFs may be analyzed with respect to the potential effect of a failure. The network survivability analysis program logic 112 is performed to assess the potential impact of a failure at each of the SPOFs. The survivability analysis program 112 may provide a set of criteria to analyze survivability impacts of each SPOF, such as the percentage of INLs impacted by the failure. As another example, the percentage of traffic that can be re-routed after a failure of a particular SPOF may be estimated and reported. Alternatively, the survivability impact and re-routed traffic estimates may be performed off-line by operations personnel.

From use of the network survivability analysis program logic 112, a network operator may assess the severity and priority for each of the SPOFs. In addition, the analysis program logic 112 may provide alternatives or recommended network changes to provide redundancy with respect to each of the SPOFs. The display and reporting system 108 may display or provide reports to a network operator of the SPOFs 120, the survivability metrics, and the recommended network changes 130. Also, a user of the system 100 may use the display and reporting system 108, such as a desktop computer device, to communicate instructions to the network evaluation system 106 in an interactive manner to control the network evaluation during execution.

Figure 2:
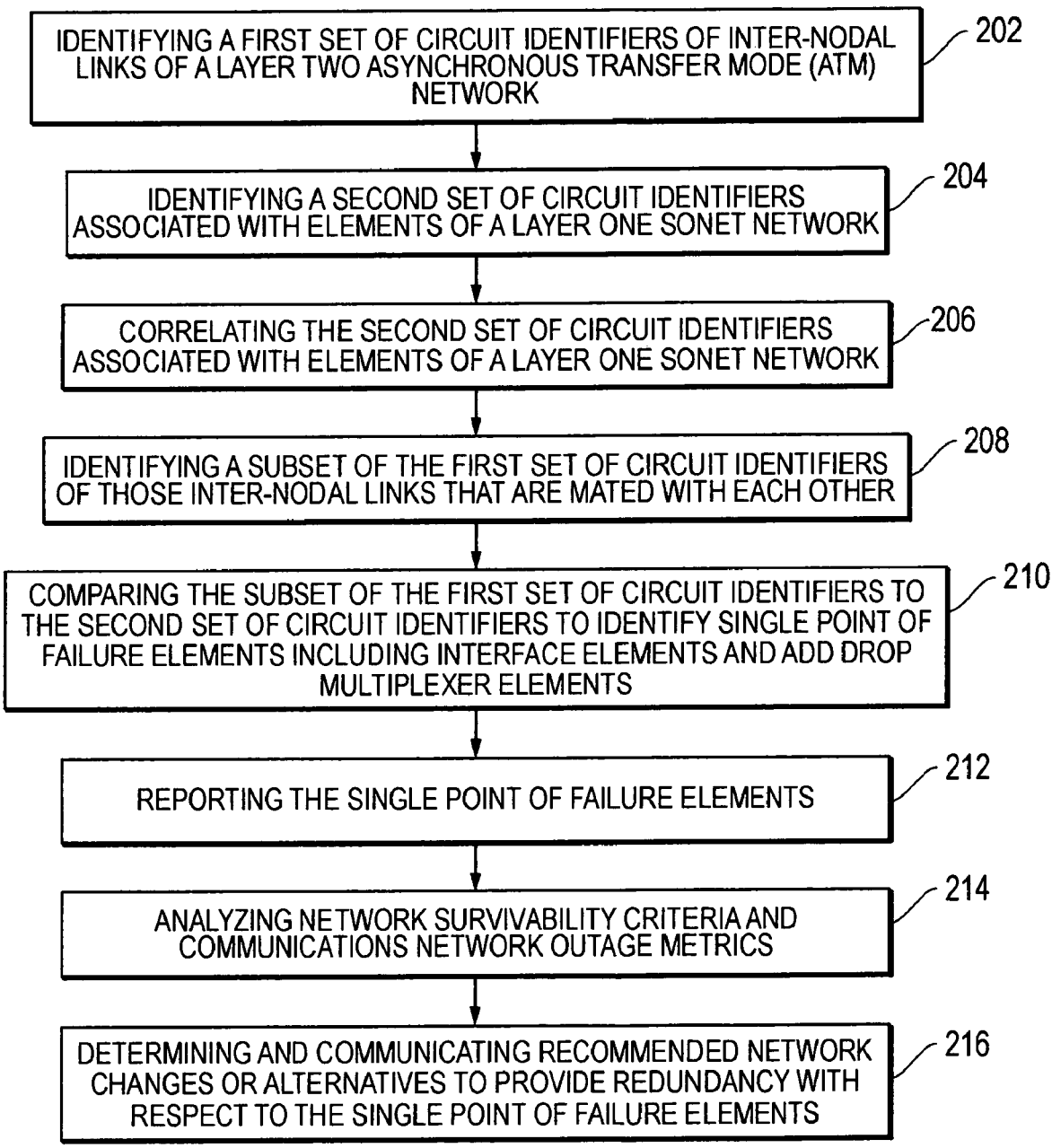
FIG. 2 is a flow chart that illustrates a method of evaluating a network.

Referring to FIG. 2, a method of using the system of FIG. 1 is illustrated. The method includes identifying a first set of circuit identifiers of inter-nodal links of a layer two asynchronous transfer mode (ATM) network, at 202. The method further includes identifying a second set of circuit identifiers associated with elements of a layer one SONET network, at 204. The second set of circuit identifiers is then correlated with the first set of circuit identifiers of elements of the SONET network, at 206. The method of operation further includes identifying a subset of the first set of circuit identifiers associated with those inter-nodal links that are mated with each other, at 208. The subset of the first set of circuit identifiers are then compared to the second set of circuit identifiers to identify single point of failure elements, such as interface elements and add drop multiplexer elements, at 210.

The SPOF elements are then communicated and reported to a network operator, at 212. The SPOF element report may be analyzed to assess network survivability using survivability criteria, as shown at 214. The results of the survivability analysis, such as network outage and similar metrics, may be analyzed and communicated to the network operator, at 214. An example of network outage data includes a percentage of INLs affected and the percentage of traffic that is and that is not re-routable. The method further includes the optional step of determining and communicating recommended network changes or alternatives to provide redundancy to address and attempt a remedy for each of the SPOFs. The alternatives and network changes can also be displayed together with estimated survivability improvement metrics and measurement criteria upon implementation, as shown at 216. In this manner, network survivability can be assessed, improved, and proactively managed.

The method illustrated with respect to FIG. 2 may be implemented as software instructions in one or more programs to be stored in a computer readable medium and that are executable by a computer processor of a computer system. For example, the method may be implemented by a computer program that includes a first set of program instructions to evaluate data including a first set of circuit identifiers of inter-nodal links of an ATM network and a second set of program instructions to evaluate a second set of circuit identifiers associated with elements of a SONET network. The computer program includes a third set of program instructions to correlate the second set of circuit identifiers associated with elements of a layer one SONET network with the first set of circuit identifiers, to identify a subset of the first set of circuit identifiers of those inter-nodal links that are mated with each other, and to compare the subset of the first set of circuit identifiers to the second set of circuit identifiers to identify single point of failure elements, such as interface elements and add drop multiplexer elements. In a particular embodiment, the computer program may include a fourth set of instructions to analyze network survivability criteria based on the single point of failure elements. The fourth set of instructions may optionally determine a percentage of traffic that is re-routable after failure of each of the single point of failure elements.

While the above described functionality has been described as separate sets of instructions for illustrative purposes, it should be understood that the above method and functionality may be implemented in one or more computer programs and each program may include one or more software modules, or sets of instructions, that may be grouped differently than the specific example described herein.

Figure 3:
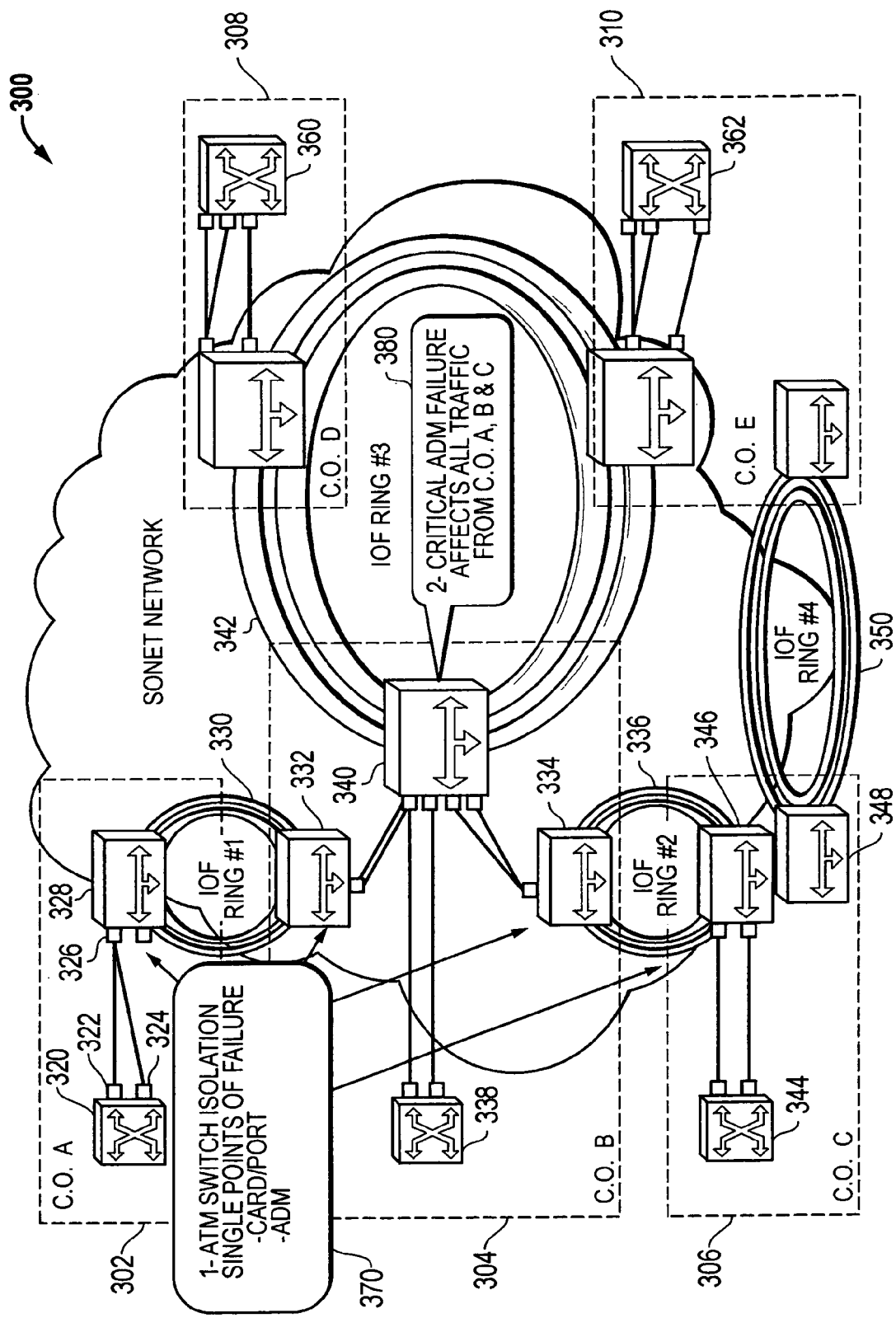
FIG. 3 illustrates an ATM and SONET network.

Referring to FIG. 3, an illustrative example of a simplified ATM and SONET network having SPOFs is shown. The network 300 includes five central offices 302, 304, 306, 308, 310 (COs A, B, C, D, and E). The first central office (CO A) 302 includes an edge ATM switch 320 having a first connection 322 and a second connection 324 to a first port 326 of an add drop multiplexer 328 of an inter office facility (IOF) SONET ring 330.

The second central office 304 includes an add drop multiplexer 332 of the IOF SONET ring 330 and includes an add drop multiplexer 334 of a second IOF SONET ring 336. The second central office 304 includes an edge ATM switch 338 having two connections to an add drop multiplexer 340 of a third IOF SONET ring 342. The add drop multiplexer 340 is also connected to the add drop multiplexer 332 of the first IOF SONET ring 330 and to the multiplexer 334 of the second IOF SONET ring 336.

The network 300 also includes a third central office 306 that includes an edge ATM switch 344 and an add drop multiplexer 346 of the second IOF SONET ring 336 and an add drop multiplexer 348 of a fourth IOF SONET ring 350.

The third IOF ring 342 is connected to add drop multiplexers at both the fourth central office 308 and the fifth central office 310. Each of the fourth and fifth central offices 308, 310 include core ATM switches 360, 362.

In the simplified network 300 as shown, there is a first SPOF element 370 and a second SPOF 380. The first SPOF 370 corresponds to the single port 336 having two connections to the ATM switch 320. In this example, the two connections to the ATM switch 322, 324 are mated connections and were designed to be redundant to each other. Since both of the two connections 322, 324 pass though a single port 326, there is risk of isolation of the ATM switch 320 due to a single point of failure (SPOF) at 326. In the figure only two SPOF are specifically marked. There are also other SPOF as well which are not discussed here since they have similar attributes. These other SPOFs are: ADM 332, ADM 334, ADM 346, and ADMs in locations 308 and 310.

The second SPOF is at the ADM 340. A failure of the ADM 340 would affect traffic from the central offices 302, 304, and 306. In effect, each of the edge ATM switches within the central offices 302, 304, 306 (COs A-C) would be isolated from the core ATM switches in central offices 308 and 310. Network survivability due to a failure of the ADM 340 would be difficult and significant traffic would be affected. Each of the two SPOFs identified can be located using the disclosed system and method of FIGS. 1 and 2. These two SPOFs would not be identified using conventional single network tools (e.g. ATM or SONET specific evaluation tools). Thus, the system and method disclosed provides network operators a useful and automated tool to identify SPOFs and to assist in finding remedies to avoid failures in the network that would drop customer circuits or isolate an ATM switch from the network.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of identifying potential failure points between a layer two asynchronous transfer mode (ATM) network and a layer one Synchronous Optical Network (SONET), the method comprising:
   receiving, by a network evaluation system, a first set of circuit identifiers of inter-nodal links of the layer two ATM network, the first set of circuit identifiers including inter-nodal link endpoints;
   receiving, by the network evaluation system, a second set of circuit identifiers associated with elements of the layer one SONET network, the second set of circuit identifiers include identifiers associated with elements of a plurality of different facility SONET rings;
   correlating, by the network evaluation system, the second set of circuit identifiers with the first set of circuit identifiers;
   identifying a subset of the first set of circuit identifiers of those inter-nodal links that are mated with each other and that have redundancy; and
   matching, by the network evaluation system, the subset of the first set of circuit identifiers to the second set of circuit identifiers to identify single point of failure elements in the layer one SONET network and single point of failure elements in the layer two ATM network including interface elements and add drop multiplexer elements.

2. The method of claim 1, further comprising reporting the single point of failure elements.

3. The method of claim 2, further comprising analyzing network survivability criteria based on the single point of failure elements.

4. The method of claim 3, further comprising determining a first network change to provide for redundancy with respect to at least one of the single point of failure elements.

5. The method of claim 4, further comprising communicating the first network change as a network recommendation.

6. The method of claim 4, further comprising determining a second network change to provide redundancy with respect to a second of the single point of failure elements.

7. The method claim 1, wherein the single point of failure elements are precategorized to at least one type of failure.

8. The method of claim 7, wherein a first type of single point of failure element is an interface port to an ATM switch.

9. The method of claim 7, wherein a second type of single point of failure element is an add drop multiplexer element of a SONET ring.

10. A system comprising:
    a first input to receive a first set of circuit identifiers of inter-nodal links of a layer two asynchronous transfer mode (ATM) network, the first set of circuit identifiers including inter-nodal link endpoints;
    a second input to receive a second set of circuit identifiers associated with elements of a layer one Synchronous Optical Network (SONET) network, the second set of circuit identifiers including identifiers associated with elements of a plurality of different facility SONET rings;
    a network evaluation system to identify potential failure points between the layer two ATM network and the layer one SONET network, the network evaluation system including program logic to:
      correlate the second set of circuit identifiers associated with the elements of the layer one SONET network with the first set of circuit identifiers,
      identify a subset of the first set of circuit identifiers of those inter-nodal links that are mated and that have redundancy, and
      match the subset of the first set of circuit identifiers to the second set of circuit identifiers to identify single point of failure elements in the layer one SONET network and single point of failure elements in the layer two ATM network including interface elements and add drop multiplexer elements.

11. The system of claim 10, further comprising a display terminal responsive to the network evaluation system, the display terminal to report the single point of failure elements.

12. The system of claim 10, wherein the network evaluation system further comprises analysis logic to analyze network survivability criteria based on the single point of failure elements.

13. The system of claim 11, wherein the display terminal displays network change recommendations corresponding to a network change to provide for redundancy with respect to at least one of the single point of failure elements.

14. The system of claim 13, wherein the network change provides redundancy with respect to a plurality of the single point of failure elements.

15. The system of claim 10, wherein the first input receives data from a Trunk Information Record Keeping System (TIRKS) system or any inventory system that can provide similar input data.

16. The system of claim 12, wherein the analysis logic determines a percentage of traffic that is re-routable after failure of one of the single point of failure elements.

17. A computer readable storage medium having stored thereon a computer program having program instructions executable by a computer processor to:
    evaluate data including a first set of circuit identifiers of inter-nodal links of an asynchronous transfer mode (ATM) network, the first set of circuit identifiers including inter-nodal link endpoints;
    evaluate a second set of circuit identifiers associated with elements of a Synchronous Optical Network (SONET) network, the second set of circuit identifiers including identifiers associated with elements of a plurality of different facility SONET rings;
    correlate the second set of circuit identifiers associated with the elements of the SONET network with the first set of circuit identifiers to identify a subset of the first set of circuit identifiers of those inter-nodal links that are mated and that have redundancy; and
    match the subset of the first set of circuit identifiers to the second set of circuit identifiers to identify single point of failure elements in the SONET network and single point of failure elements in the ATM network.

18. The computer readable storage medium of claim 17, further comprising program instructions executable by the computer processor to analyze network survivability criteria based on the single point of failure elements.

19. The computer readable storage medium of claim 18, further comprising program instructions executable by the computer processor to determine a percentage of traffic that is re-routable after failure of each of the single point of failure elements.

* * * * *